UNITED STATES PATENT OFFICE.

ROBERT GNEHM AND JAKOB SCHMID, OF BASLE, SWITZERLAND, ASSIGNORS TO THE SOCIETY OF CHEMICAL INDUSTRY, OF SAME PLACE.

VIOLET COLORING-MATTER.

SPECIFICATION forming part of Letters Patent No. 413,048, dated October 15, 1889.

Application filed April 6, 1888. Serial No. 269,711. (Specimens.) Patented in France April 18, 1888, No. 190,067.

*To all whom it may concern:*

Be it known that we, ROBERT GNEHM and JAKOB SCHMID, both citizens of Switzerland, residing at Basle, Switzerland, have invented a new and useful Improvement in the Production of a Violet Coloring-Matter, (for which Letters Patent have been granted to us in France, No. 190,067, bearing date April 18, 1888,) of which the following is a specification.

This invention is based on the discovery that metaoxydiphenylamine, which has been first described by V. Merz and W. Weith, (*Berichte der deutschen chemischen Gesellschaft*, XIV, 1881, page 2,345,) when transformed into a phenylized derivation of meta-amidophenolphthaleine, produces coloring-matters which have the same relation to the ordinary meta-amidophenolphthaleine as the rosaniline blue has to fuchsine.

The violet coloring-matter which forms the subject matter of this present application for a patent is produced by melting two molecules of metaoxydiphenylamine with one molecule of phthalic-acid anhydride in the presence of chloride of zinc or another condensing agent at a temperature of 160° to 170° centigrade.

In carrying out our invention we can proceed as follows: 5.5 kilograms of metaoxydiphenylamine, 2.5 kilograms of phthalic-acid anhydride, and 5.5 kilograms of chloride of zinc are intimately mixed and melted in an oil bath at a temperature of 160° to 170° centigrade, the heat being maintained for about two hours, when the reaction is terminated. The molten mass, which is at first semi-fluid, soon becomes solid. The glass-like melt, which is of a bluish-black color, is, when cold, finely pulverized and repeatedly boiled out with diluted hydrochloric acid, diluted soda-lye, and water, and finally the coloring-matter is obtained in a pure state by extraction from alcohol.

The coloring-matter itself is a powder of a glistening copper-like appearance, which may be designated "monophenylmeta-amidophenolphthaleine." It dissolves in alcohol with a violet-red color. It is insoluble in water, diluted acids, and alkalies, as well as in benzole and ligroine. It dissolves easily in hot concentrated sulphuric acid and precipitates upon addition of cold water. When zinc-dust and ammonia are added, the violet alcoholic solution becomes discolored. The original color is, however, restored by agitation with water and air, or quicker when an oxidizing agent is added. It dyes silk a beautiful violet. The dyes show a strong copper-red fluorescence and are prominent by their considerable fastness to air and light.

The formula of our new coloring-matter is as follows:

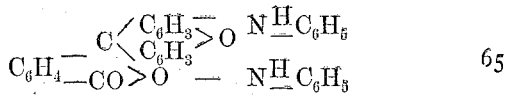

What we claim as new, and desire to secure by Letters Patent, is—

As a new product, the violet coloring-matter or dye-stuff monophenylmeta-amidophenolphthaleine, which forms a powder of a glistening copper-like appearance, insoluble in water and in benzine, soluble in alcohol with a violet-red color, and which dyes silk a beautiful violet with a strong copper-red fluorescence.

In testimony whereof we have hereunto set our hands and seals in the presence of two subscribing witnesses.

ROBERT GNEHM. [L. S.]
  JAKOB SCHMID. [L. S.]

Witnesses:
 GEORGE GIFFORD,
 N. HENZI.